United States Patent
Dropps

(10) Patent No.: US 11,169,921 B2
(45) Date of Patent: Nov. 9, 2021

(54) TERNARY CONTENT ADDRESSABLE MEMORY-ENHANCED CACHE COHERENCY ACCELERATION

(71) Applicant: Hewlett Packard Enterprise Development LP, Houston, TX (US)

(72) Inventor: Frank R. Dropps, Annandale, MN (US)

(73) Assignee: Hewlett Packard Enterprise Development LP, Houston, TX (US)

(*) Notice: Subject to any disclaimer, the term of this patent is extended or adjusted under 35 U.S.C. 154(b) by 50 days.

(21) Appl. No.: 16/408,346

(22) Filed: May 9, 2019

(65) Prior Publication Data

US 2020/0356483 A1  Nov. 12, 2020

(51) Int. Cl.
  *G06F 12/0817* (2016.01)
(52) U.S. Cl.
  CPC .... *G06F 12/0817* (2013.01); *G06F 2212/608* (2013.01); *G06F 2212/62* (2013.01)
(58) Field of Classification Search
  CPC .......... G06F 12/0817; G06F 2212/608; G06F 2212/62
  See application file for complete search history.

(56) References Cited

U.S. PATENT DOCUMENTS

| | | | |
|---|---|---|---|
| 6,763,435 B2 | 7/2004 | Arimilli et al. | |
| 7,234,029 B2 | 6/2007 | Khare et al. | |
| 7,669,010 B2 | 2/2010 | Lais et al. | |
| 7,774,551 B2 | 8/2010 | Gaither et al. | |
| 9,009,401 B2 | 4/2015 | Asamoto | |
| 9,684,597 B1* | 6/2017 | Eiriksson | G06F 12/0815 |
| 2002/0019913 A1* | 2/2002 | Shimizu | G06F 12/0835 711/141 |
| 2006/0224838 A1* | 10/2006 | Blumrich | G06F 12/0831 711/146 |
| 2008/0104332 A1* | 5/2008 | Gaither | G06F 12/0822 711/141 |

(Continued)

OTHER PUBLICATIONS

Computer ARchitecture Lecture 20: Multiprocessors, Consistency, Cache Coherence (II), Prof. Onur Mutlu Fall 2017 Nov. 30, 2017. https://safari.ethz.ch/architecture/fall2017/lib/exe/fetch.php?media=onur-comparch-fall2017-lecture20-multiprocessorscoherenceconsistency-ii-afterlecture.pdf (Year: 2017).*

(Continued)

*Primary Examiner* — William E. Baughman
*Assistant Examiner* — Janice M. Girouard
(74) *Attorney, Agent, or Firm* — Sheppard Mullin Richter & Hampton LLP

(57) ABSTRACT

A system and method for cache coherency within multiprocessor environments is provided. Each node controller of a plurality of nodes within a multiprocessor system receives a cache coherency protocol request from local processor sockets and other node controller(s). A ternary content addressable memory (TCAM) accelerator in the node controller determines if the cache coherency protocol request comprises a snoop request and, if it is determined to be a snoop request, searching the TCAM based on an address within the cache coherency protocol request. In response to detecting only one match between an entry of the TCAM and the received snoop request, sending a response to the requesting local processor a response without having to access a coherency directory.

19 Claims, 8 Drawing Sheets

(56) References Cited

U.S. PATENT DOCUMENTS

| | | | |
|---|---|---|---|
| 2009/0190404 A1* | 7/2009 | Roohparvar | G11C 16/08 |
| | | | 365/185.17 |
| 2015/0278112 A1* | 10/2015 | Gschwind | G06F 12/1027 |
| | | | 711/205 |
| 2017/0185519 A1* | 6/2017 | Marshall | G06F 12/0808 |
| 2018/0137003 A1* | 5/2018 | Pignatelli | G06F 11/1012 |
| 2018/0314644 A1* | 11/2018 | Hwang | G06F 12/1009 |
| 2018/0365149 A1* | 12/2018 | Zoellin | G06F 12/0833 |
| 2019/0251029 A1* | 8/2019 | Steinmacher-Burow | |
| | | | G06F 12/0817 |

OTHER PUBLICATIONS

Class notes that show CAM is used for (address) tag lookup for Cache. Note p. 4 shows that an input is an (logical) address, and the output is a binary (physical) address. Downloaded from url httpwww-classes.usc.eduengree-s457EE457_ClassnotesEE457_Chapter7ee457_Ch7_P1_CacheCAM.pdf (Year: 2017).*

Jun Ohno and Kei Hiraki, "Accelerating Cache Coherence Mechanism with Speculation," Jun. 2014, p. 171, University of Tokyo, Tokyo, Japan, ACM.

Libo Huang et al., "Integrated Coherence Prediction: Towards Efficient Cache Coherence on NoC-Based Multicore Architectures," Jun. 2014, pp. 1-22, ACM.

Viacheslav Fedorov, "Memory Management for Emerging Memory Technologies," Dissertation, Aug. 2016, pp. 1-150, Texas A&M University.

* cited by examiner

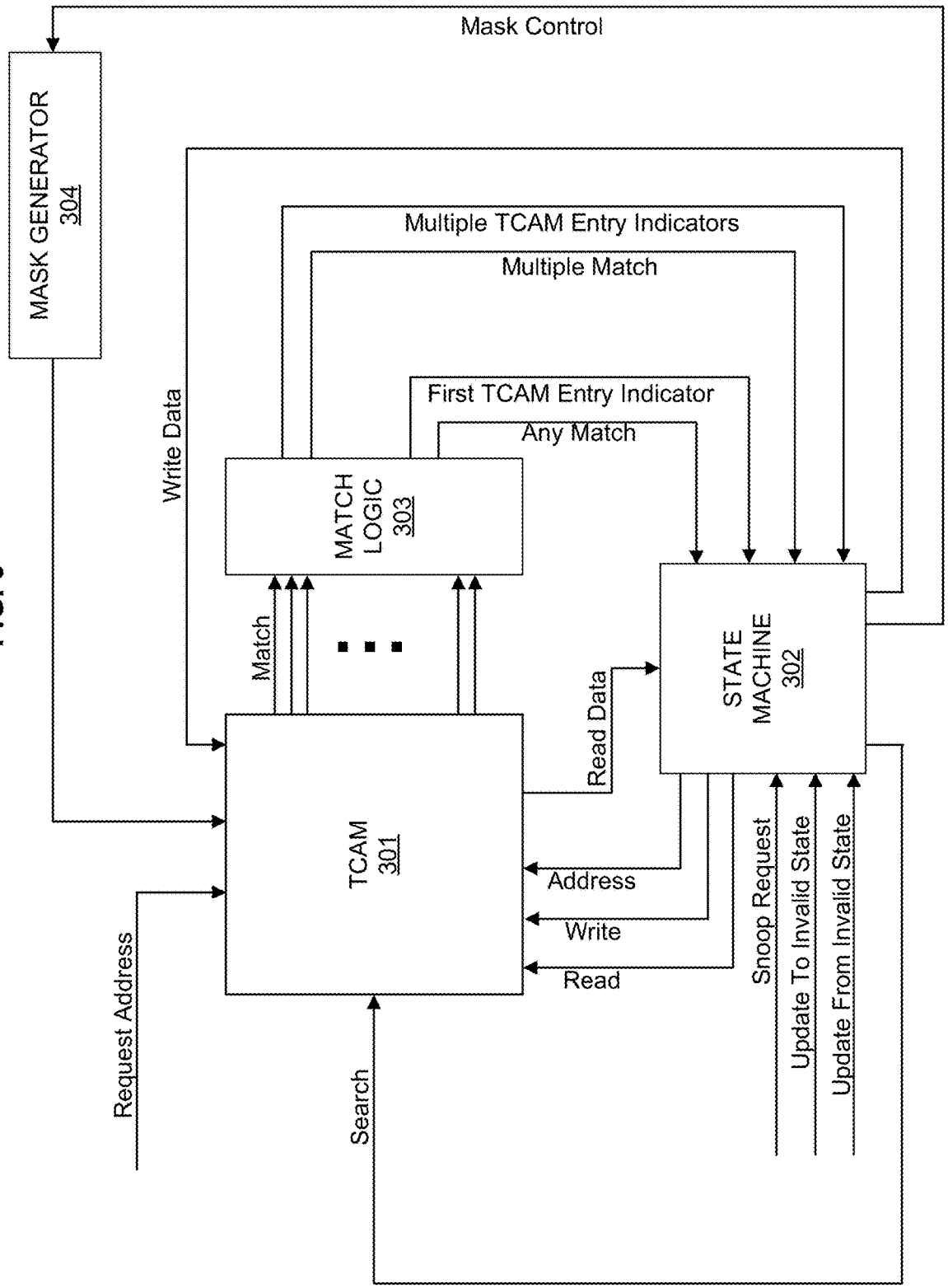

TERNARY CONTENT ADDRESSABLE MEMORY-ENHANCED CACHE COHERENCY ACCELERATION

BACKGROUND

In symmetric multiprocessing (SMP) systems, multiple processors are configured to share a common operating system and memory resources. A single copy of the operating system manages all of the processor in the system. SMP is also referred to as "tightly coupled multiprocessing" because all of the processor are connected via a shared bus or network and have access to the same shared memory resource. The throughput of an SMP system is higher than single-processor systems as all the processors are running in parallel. Moreover, reliability is increased. If a processor socket were to fail (e.g., a short on that processor's board) that processor's workload can be distributed amongst the other sockets, whereas if the processor in a single-processor fails, the system fails.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 3 is a circuit diagram illustrating an example TCAM accelerator in accordance with embodiments of the technology disclosed herein.

Figure 1:
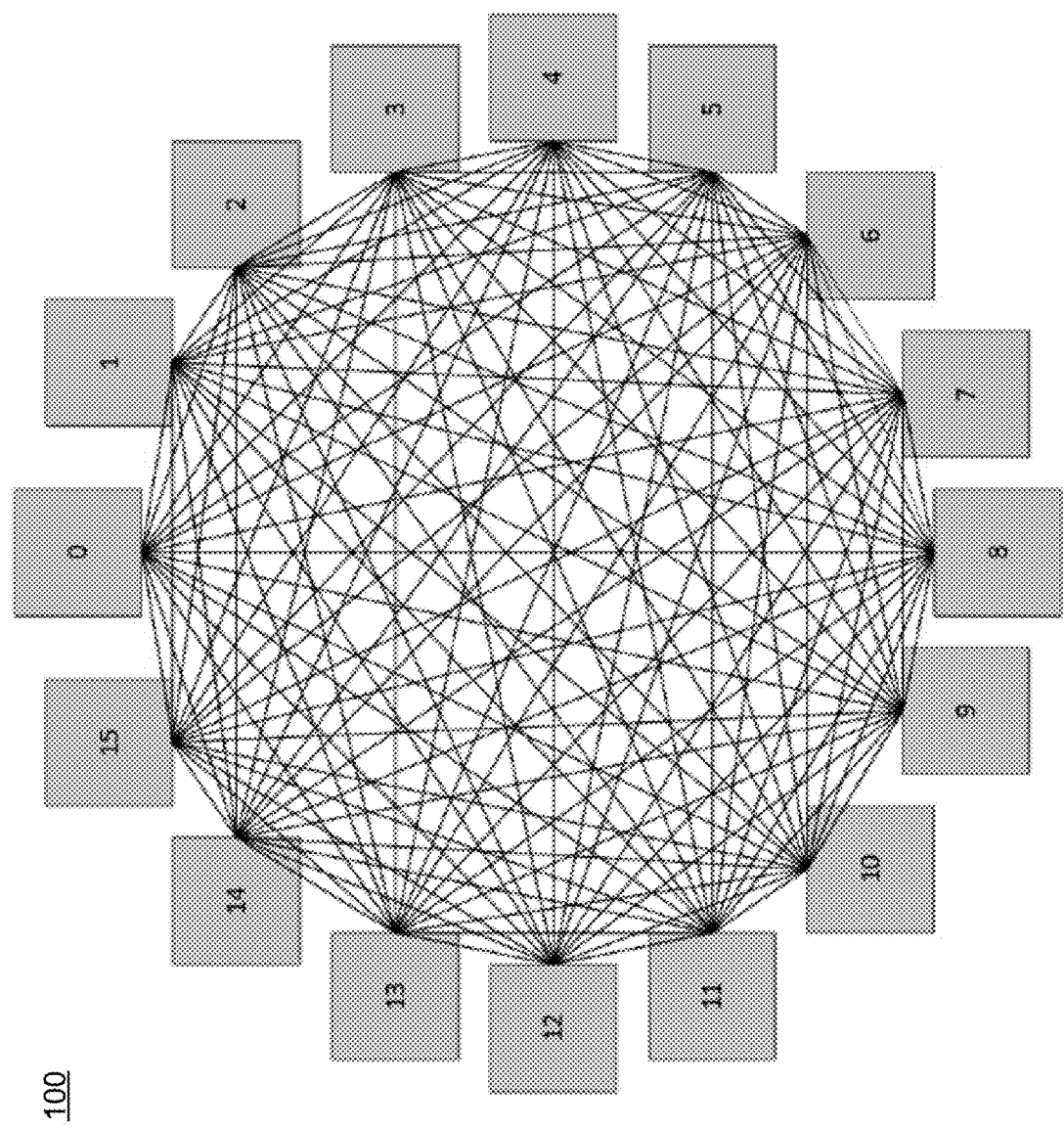
FIG. 1 is an example architecture in accordance with embodiments of the technology disclosed herein

The figures are not exhaustive and do not limit the present disclosure to the precise form disclosed.

DETAILED DESCRIPTION

Non-uniform memory access (NUMA) is a memory design for SMP systems. Generally, a NUMA architecture includes a plurality of nodes interconnected over an SMP bus or network. Each node itself is a small-scale SMP, comprising several processor sockets and associated memory interconnected amongst themselves, with the memory within the node being shared by all of the processor sockets. Memory within a node may be considered local memory to the processors of the node, while memory of other nodes may be considered remote memory. Node controllers within each node enable the processor sockets to access remote memory within the system. A node controller may be considered an advanced memory controller, managing access to some or all of the local memory and the node's processor sockets access to remote memory.

Each of the node controllers participate in the cache coherency protocol for the system. Cache coherency concerns ensuring uniformity in data blocks, meaning that any variable that is to be used has a consistent value across all local caches. Various cache coherency protocols may be used, such as MESI, MESIF, MOESI, and other protocols. Upon receiving a cache coherency message/request (e.g., a snoop request, a cache directory update, etc.) from a local processor, the receiving node controller determines whether the state of any cache entries need be updated and what response should be returned. The different protocols may utilize a combination of several different ownership states, including modified (M), exclusive (E), shared (S), and invalid (I).

Each processor socket maintains a coherency directory tracking ownership of cache lines, data words, bits, or other data blocks within the system. Before responding to any cache coherency protocol request, the receiving node controller needs to determine the current state of the requested information. To do so, the node controller must access a coherency directory maintained by the node controller. The lack of precision in current coherency protocols results in the node controller receiving coherency requests for data blocks, normally processor cache line sized blocks, not proxied by the node controller (i.e., not owned by any of its associated processor sockets). These non-proxied data blocks are generally tracked as invalid yet, because the coherency directory need be checked, the node controller's response to the requesting processor or node controller is delayed, which may impact an application's execution.

Embodiments of the present invention provide an efficient means of maintaining and managing cache coherency within an SMP. The technology disclosed herein leverage that the majority of requested data blocks are not owned (i.e., are in an invalid state). In various embodiments, the node controller includes a ternary content addressable memory (TCAM) configured to track data block usage by associated processor sockets. Each TCAM includes at least two types of entries—base entries and precision entries. A base entry may comprise a dynamically sized block of system memory, and a precision entry may comprise a specific data block address or smaller range of addresses than a base entry. The node controller checks the received request against the TCAM to determine whether there are any matches. If only one entry of the TCAM matches the requested address, the node controller can respond to the requesting processor or node controller that the requested address is invalid, without the need to access the coherency directory. This results in a more efficient implementation of the cache coherency protocol.

FIG. 1 illustrates an example architecture 100 in accordance with embodiments of the present disclosure. Example architecture 100 is provided for illustrative purposes only, and should not be interpreted as limiting the scope of the subject matter disclosed herein to architecture 100. A person of ordinary skill in the art would know that embodiments of the technology disclosed herein are applicable to any multiprocessing system with shared memory resources. As illustrated in FIG. 1, architecture 100 comprises 16 nodes. In various embodiments, more than 16 nodes may be included within architecture 100. Each node (0-15) is connected to every other node within architecture 100. In various embodiments, a node may be directly connected to one or more nodes as depicted in architecture 100, while in other embodiments a node may be connected to one or more nodes through other devices, including but not limited to routers and switches. In various embodiments, each node (0-15) may include one or more processors and one or more node controllers (not shown in FIG. 1), which is an advanced memory controller configured to enable processors within each node to access memory on all the other nodes.

Figure 2:
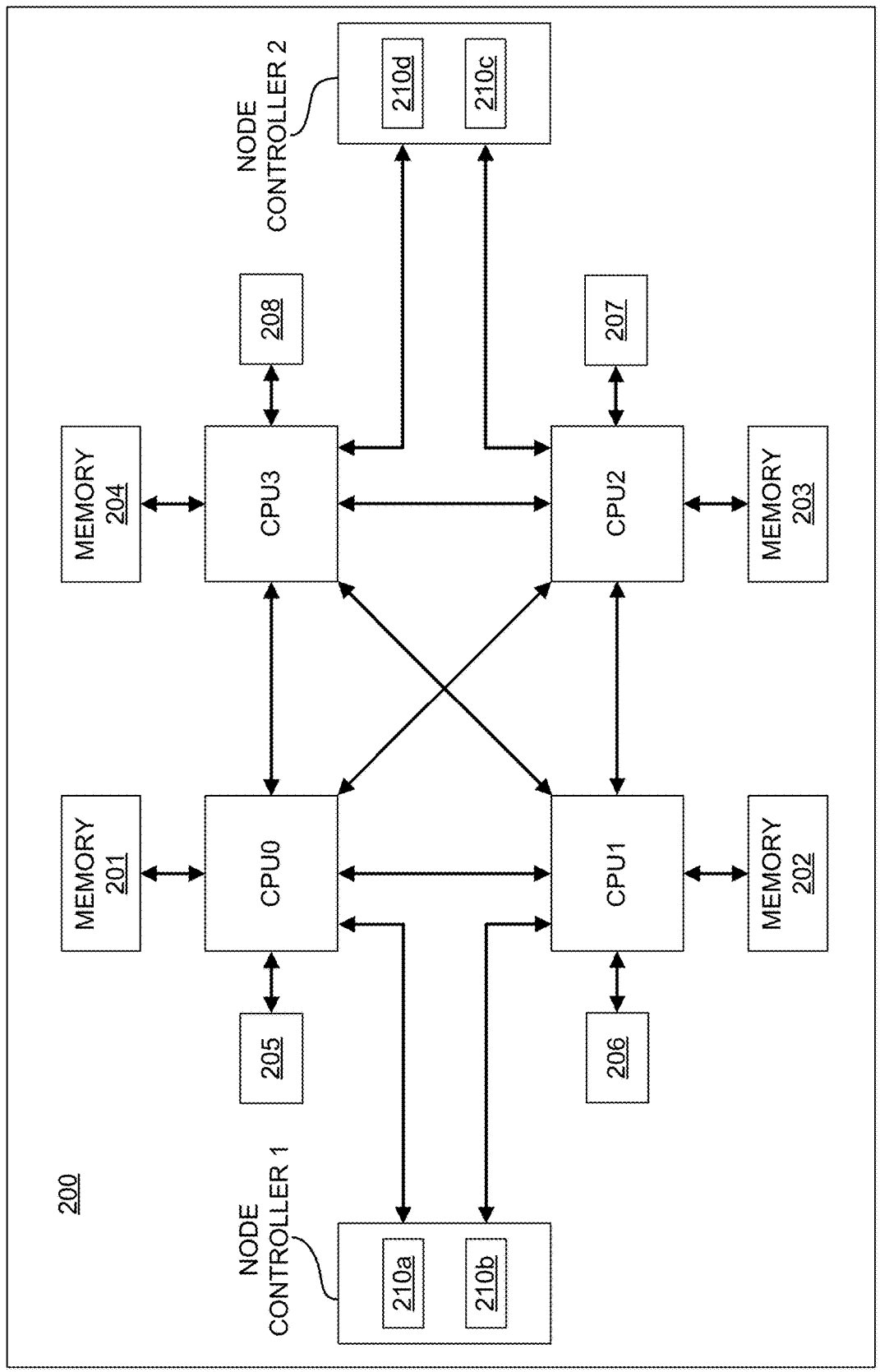
FIG. 2 is an example node in accordance with embodiments of the technology disclosed herein.

FIG. 2 illustrates an example node 200 in accordance with embodiments of the present disclosure. In various embodiments, node 200 may represent one or more of the nodes (0-15) discussed with respect to FIG. 1. Node 200 is provided for illustrative purposes only and should not be interpreted as limiting the scope of the technology discussed herein to only node 200. Node 200 shows only those components relevant to explaining the technology of the present disclosure, and a person of ordinary skill in the art would know how to implement common components of processing systems omitted from node 200.

In various embodiments, node 200 may be implemented as a single integrated circuit, including but not limited to an application specific integrated circuit (ASIC), a field programable gate array (FPGA), a programmable logic array (PLA), complex programmable logic device (CPLD), or other integrated circuit component. In some embodiments, node 200 may comprise a printed circuit board (PCB) or multi-chip module with a plurality of chipsets disposed therein. As illustrated, node 200 includes four processors CPU0, CPU1, CPU2, CPU3. Each processor may contain one or more processor cores. Node 200 may have a similar structure to an SMP system, with each processor CPU0, CPU1, CPU2, CPU3 communicatively coupled to each other and having access to each memory 201, 202, 203, 204. In various embodiments, memory 201, 202, 203, 204 may comprise one or more types of non-transitory machine-readable storage media, including but not limited to: solid state storage devices (SSDs), single in-line memory modules (SIMMs), dual in-line memory modules (DIMMs), dynamic random-access memory (DRAM), static random-access memory (SRAM), among other common types of computer memory.

Each processor CPU0, CPU1, CPU2, CPU3 manages its respective memory component. Requests for data stored on memory 201, 202, 203, 204 are directed to the respective processor CPU0, CPU1, CPU2, CPU3. As a non-limiting example, if CPU2 needs a data block at an address in local memory 204, CPU2 may send a request to CPU3 to retrieve the requested data block and provide the data block to CPU2. In various embodiments, each memory 201, 202, 203, 204 may have an associated memory controller configured to control access to the data blocks of its respective memory component. Each memory controller may implemented as a specialized logic circuit in some embodiments.

Although illustrated with each memory 201, 202, 203, 204 directly connected to one processor CPU0, CPU1, CPU2, CPU3, a person of ordinary skill in the art would know that in some embodiments each processor socket CPU0, CPU1, CPU2, CPU3 may be connected to one or more memory components. As a non-limiting example, CPU0 and CPU3 may be connected to memory 201, allowing both processors CPU0, CPU3 to directly access memory 201.

Memories 201, 202, 203, 204 combine with the local memories of other nodes within the system to form a shared main memory having a global address space. In various embodiments, memories 201, 202, 203, 204 may be combined into a local node memory, and the memories of other nodes in the system may be considered remote memory. Each memory 201, 202, 203, 204 may be a logical portion of the shared main memory, similar to a Level 3 cache. In various embodiments, each processor CPU0, CPU1, CPU2, CPU3 may include dedicated CPU cache (i.e., Level 1 cache, Level 2 cache) (not shown in FIG. 2) for storing copies of frequently used data from local memory (i.e., the combination of memories 201, 202, 203, 204) or remote memory (i.e., memories associated with remote nodes).

In various embodiments, each processor socket may have a dedicated cache 205, 206, 207, 208 comprising smaller, faster hardware memory associated with a respective processor CPU0, CPU1, CPU2, CPU3, respectively. Caches 205, 206, 207, 208 may be implemented in a variety of cache architectures, including but not limited to a set associated cache, a fully associative cache, a direct-mapped cache schematics, among other cache architectures common in the art. In some embodiments, caches 205, 206, 207, 208 may be implemented within processors CPU0, CPU1, CPU2, CPU3 as a single component. Caches 205, 206, 207, 208 may comprise one or more types of common cache memory components, including but not limited to SRAM, synchronous DRAM (SDRAM), flash memory, embedded DRAM (eDRAM), non-volatile RAM (NVRAM), among other types of cache memory components. Each respective cache 205, 206, 207, 208 is dedicated to each processor CPU0, CPU1, CPU2, CPU3, holding copies of data block values from the shared main memory to increase processing speed by reducing the need to retrieve data from slower shared main memory within the system.

As discussed above, a CPU cache (not shown in FIG. 2) is configured to hold data blocks pulled from the local memory of the node (i.e., from memories 201, 202, 203, 204) or remote memory (i.e., memories associated with remote nodes). Caches 205, 206, 207, 208 may be configured to store copies of data blocks retrieved from addresses in remote memory, from a different node. In some embodiments, CPU caches and caches 205, 206, 207, 208 may be combined into a single component.

Node 200 includes two node controllers, node controller 1 and node controller 2. As discussed above, node controller 1 and node controller 2 are tasked with managing the access of respective processors CPU0, CPU1, CPU2, CPU3 to remote memory and from remote processors to local memory. In various embodiments, there may be few or more node controllers per node. Each node controller serves as a system interconnect, providing each processor 201, 202, 203, 204 access to memory addresses within the shared memory, including the addresses present in memory components of other nodes in the system. In various embodiments, node controllers 1 and 2 may be implemented as a separate processor component, while in other embodiments node controllers 1 and 2 may be implemented as one or more specialized logic components, including but not limited to state machines configured to perform particular state operations. Each node controller 1 and 2 may comprise a plurality of fabric connectors (not shown in FIG. 2) to interconnect node controllers 1 and 2 with the other nodes within the system such as an the illustrated example in FIG. 1.

In various embodiments, each node controller 1 and 2 may control a subset of processors 201, 201, 203, 204. In the illustrated example, node controller 1 is communicatively coupled to processors CPU0 and CPU1, while node controller 2 is communicatively coupled to processors CPU2, CPU3. Moreover, each node controller 1 and 2 may proxy for all the processors on remote nodes. Node controllers 1 and 2 appear as a single remote processor to each processors CPU0, CPU1, CPU2, CPU3. This allows the processor to maintain a more compact coherency directory and device addressing. As a non-limiting example, a processor's coherency directory may only track the state of ownership information of 4 to 8 other processors or devices.

As illustrated in FIG. 2, each node controller 1 and 2 includes one or more ternary content addressable memories (TCAMs) 210a, 210b, 210c, 210d. TCAM is a specialized type of high-speed memory that searches its entire contents in a single clock cycle, similar to the common content addressable memory (CAM). While CAM provides a binary search pattern (either 0 or 1) for each bit searched, TCAM allows storage and querying of data using at least three data search conditions: 0, 1, and X. The X is referred to as a "don't care" or "wildcard" state, which indicates one or more bits which do not need to exactly match during the search to indicate a match (also referred to as a hit). Use of three search conditions enables TCAM to perform broader searches based on pattern matching, rather than the exact-match binary search of traditional CAM. TCAM can operate on entries representing various sized memory blocks, allowing dynamic sizing of address tags to search. These dynamic sized tags are linked to dynamic sizing remote or local memory data blocks. TCAM allows a single entry to cover a range either wider or smaller than the size of the relevant cache line, reducing the need for individual, specific entries for each address of concern necessary for a CAM.

Each TCAM 210a, 210b, 210c, 210d may be configured to track ownership of any data blocks accessible by one of processors CPU0, CPU1, CPU2, CPU3 or any other processor socket in the system. As discussed above, there are various cache coherency protocols that can be implemented in SMPs to address the coherency issue. Generally, these cache coherency protocols utilize state tags to ensure that coherency is maintained, with common states including modified (M), exclusive (E), shared (S), and invalid (I). Modified indicates that the cache line is "dirty," meaning the value has been modified and is different from the value in the shared memory. Exclusive indicates that the value of a cache line is the same as the value in the shared memory, and that this cache maintains the only cached copy of that data block. Shared indicates that the value is the same as the value in a memory data block of the shared memory, but there are more than one copy of the main memory data block in other caches within the system. Invalid indicates the cache line data is not valid and may be reused. Every cache line starts off in the invalid state, indicating no ownership of the respective data block.

It is desirable to accurately track ownership information for data blocks of the shared memory amongst the nodes in the SMP system. Currently, the vast majority of messages or snoop requests received from one of the plurality of local processors to a node controller results in the node controller having to access the coherency directory. However, under many conditions a large number of snooped cache lines are tracked as invalid, having no remote ownership. Regardless, the coherence directory would need to be accessed and checked to verify this fact resulting in increased response delay.

To try and accelerate this decision making process, some solutions include a tracking mechanism within the node controller. The node controller is configured to track data blocks within the memory. As nodes continue to be added to the system, the shared memory increases, and can get as high as hundreds of terabytes, with cache line lengths of only several bytes (e.g., 64 bytes). The amount of tracking memory required to track all of these cache lines individually would be far greater than can cost effectively physically fit on a processor or node control chip. Instead, the tracking occurs based on a larger data block (e.g., 2 gigabytes), rather than each individual cache line. However, this still fails to provide the level of granularity necessary to quickly respond to requests because, if a hit is detected within a tracked data block (e.g., the 2 gigabyte block), the coherency directory still needs to be checked to verify that the active cache line is or is not the cache line in the request.

In some embodiments, counters may be used to track the number of cache lines within the tracked data block. When the counter is zero, that indicates no active cache lines within that tracked data block for that processor, so the node controller can respond without accessing the coherency directory. However, when the counter is non-zero the tracking mechanism does not provide enough precision to verify whether the non-zero number of cache lines indicated as being active for the processor are the same as the requested cache line in the snoop request due to the large number of cache lines contained within the tracked data block.

The embodiments discussed herein leverages the features of TCAMs to provide a faster response. FIG. 3 is a circuit diagram illustrating an example TCAM accelerator 300 in accordance with embodiments of the present disclosure. In various embodiments, TCAM accelerator 300 may be implemented within the node controllers or processor of a node in an SMP system, like node controllers 1 and 2 discussed above with respect to FIG. 2. Example TCAM accelerator 300 is provided for illustrative purposes only, representing a simplified illustration for ease of discussion. Although a single data line is illustrated for different signal types (e.g., Read line, First TCAM Entry Indicator, etc.), a person of ordinary skill in the art would know that a plurality of one or more of the data lines shown may be present in embodiments in accordance with the present disclosure. FIG. 3 should not be interpreted as limiting the scope of the technology disclosed herein to only the illustrated configuration and/or arrangement.

TCAM accelerator 300 may be designated to track memory ownership for all of the memory blocks visible to the processor in some embodiments, while in other embodiments TCAM accelerator 300 may be designated to track memory ownership for less than all. As illustrated in FIG. 3, TCAM accelerator 300 includes TCAM 301, state machine 302, match logic 303, and mask generator 304.

State machine 302 is configured to receive several cache coherency protocol requests from the one or more local processors. For purposes of this disclosure, a cache coherency protocol request comprises any request related to ensuring cache coherency within the system. Illustrated non-limiting examples include snoop requests, cache updates to change the state of cache lines to invalid, and cache updates to change the state of cache lines from invalid to some other state (e.g., M, E, S). In various embodiments, state machine 302 may be implemented in hardware, software, firmware, or a combination thereof. As a non-limiting example, state machine 302 may be implemented as a specialized logic circuit configured to act as a finite state machine, while in another non-limiting example state machine 302 may be implemented in non-transitory machine-readable instructions maintained in a storage medium that cause a processing device of TCAM accelerator 300 to perform the state transitions discussed herein.

To conduct a search of TCAM 301, state machine 302 may send a signal to TCAM 301 over the Search line. As a non-limiting example, state machine 302 receives a snoop request from a local processor as indicated by the Snoop Request line. State machine 302 identifies the address within the snoop request and sends the identified address to TCAM 301 over the Request Address line(s), and signals a search command over the Search line. TCAM 301 detects the change on the Search line and begins a search of the TCAM entries based on the address received over the Request Address line(s). TCAM 301 sends a group of Match lines to the match logic 303. Match logic 303 determines if there is one or more matches indicated by the corresponding Match line(s). An active Match line indicates that the corresponding TCAM entry matched the address being search. The Match Logic 303 also encodes the Match lines from TCAM 301 into First TCAM Entry Indicator and Multiple TCAM Entry Indicator if there is a second matching TCAM entry. Although only two TCAM Entry Indicator lines are illustrated in FIG. 3 (First TCAM Entry Indicator and Multiple TCAM Entry Indicators), in various embodiments a plurality of TCAM Entry Indicators data lines may connect match logic 303 to state machine 302. In various embodiments, Multiple TCAM Entry Indicators may comprise a plurality of TCAM Entry Indicators data lines for each matched TCAM entry, similar to the First TCAM Entry Indicator. If a single match is detected, match logic 303 sends an indication of the match over the Any Match line to state machine 302, as well as an address associated with the matching TCAM entry over the First TCAM Entry Indicator line. Based on the indication of only a single match, state machine 302 may determine that the requested data block address (e.g., cache line, dataword, bit, etc.) is not owned by the remote processor(s) tracked by the TCAM accelerator 300 and respond to the local requesting processor socket as such. If match logic 303 identifies multiple matches it sends an indication of multiple matches over the Multiple Match line to state machine 302, as well as sending the first matching TCAM entry location over the First TCAM Entry Indicator line and the second matching TCAM entry location over the Multiple TCAM Entry Indicators (e.g., over multiple lines within the Multiple TCAM Entry Indicators). Based on identifying more than one match, state machine 302 may trigger the node controller of TCAM accelerator 300 to go and check the coherency directory cache if present to try and verify ownership and/or to go access the coherency directory maintained in local memory of the processor or any other coherency directory maintained for the node controller. If no match is detected, the match line is not asserted signaling to state machine 302 that no TCAM match was detected. In various embodiments, based on the indication of no match, state machine 302 may trigger the same action as if there were multiple matches because no hit indicates that TCAM 301 did not include an entry covering the data block of the requested for address, and therefore the lack of a hit does not provide any additional clarity about ownership, necessitating a search of the coherency directory. In other embodiments, based on the indication of no match, state machine 302 may trigger the same action as a single match (operation 416 discussed below with respect to FIG. 4A) and respond as the tracked data block is in the Invalid state.

In this way, TCAM accelerator 300 is capable of responding to snoop requests faster. As discussed in greater detail below with respect to FIGS. 4A-4C, detecting only one match indicates that, although TCAM 301 includes an entry tracking a data block range within which the requested address falls, it does not include a secondary precision entry indicating that a remote processor has some type of ownership of the data block as defined by the address. Therefore, no additional verification is necessary that requires accessing the coherency directory, enabling the node controller to respond faster to the snoop request. FIG. 3 will be further referenced in discussing FIGS. 4A-4C.

Figure 4A:
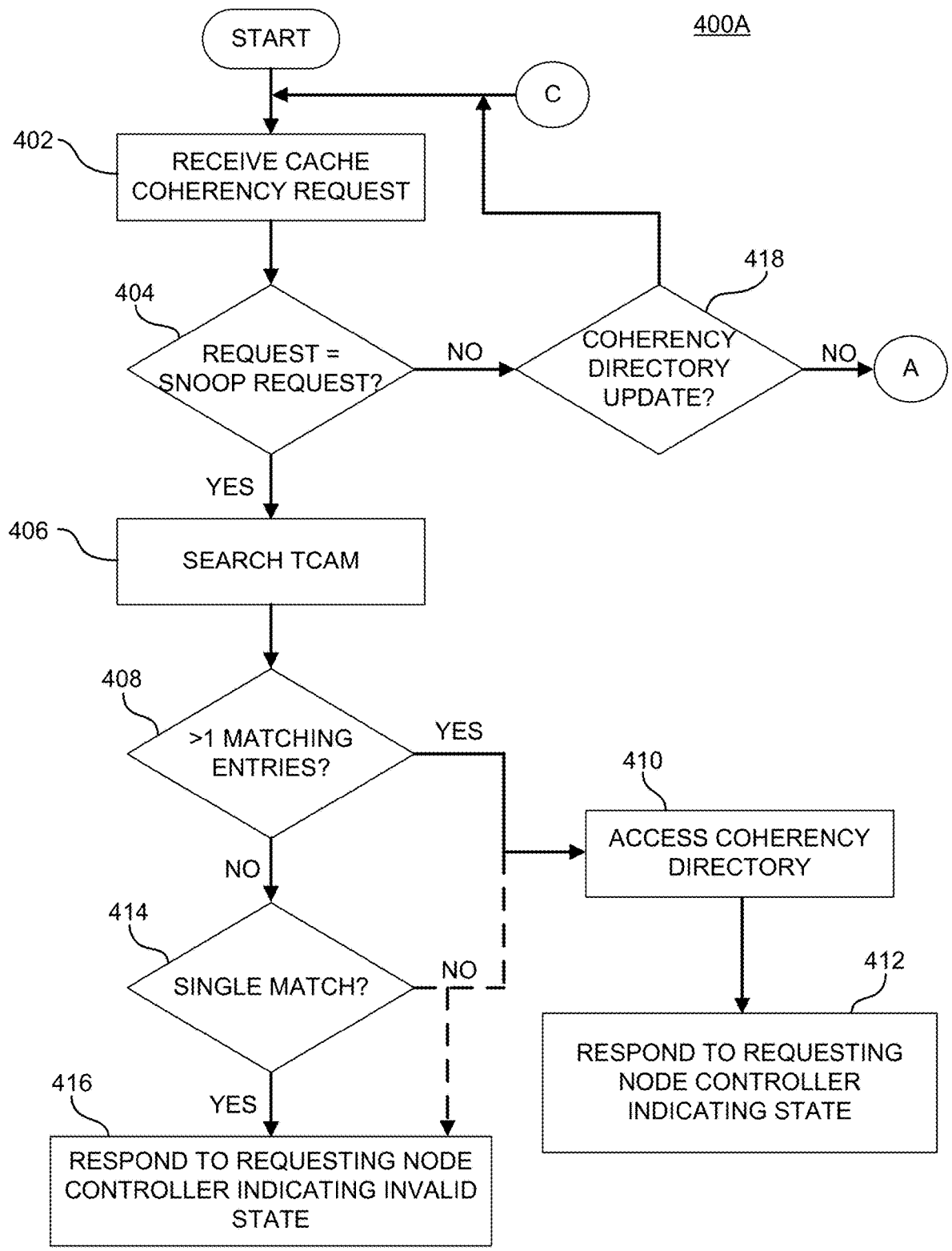
FIG. 4A is an example snoop request process in accordance with embodiments of the technology disclosed herein.
Figure 4B:
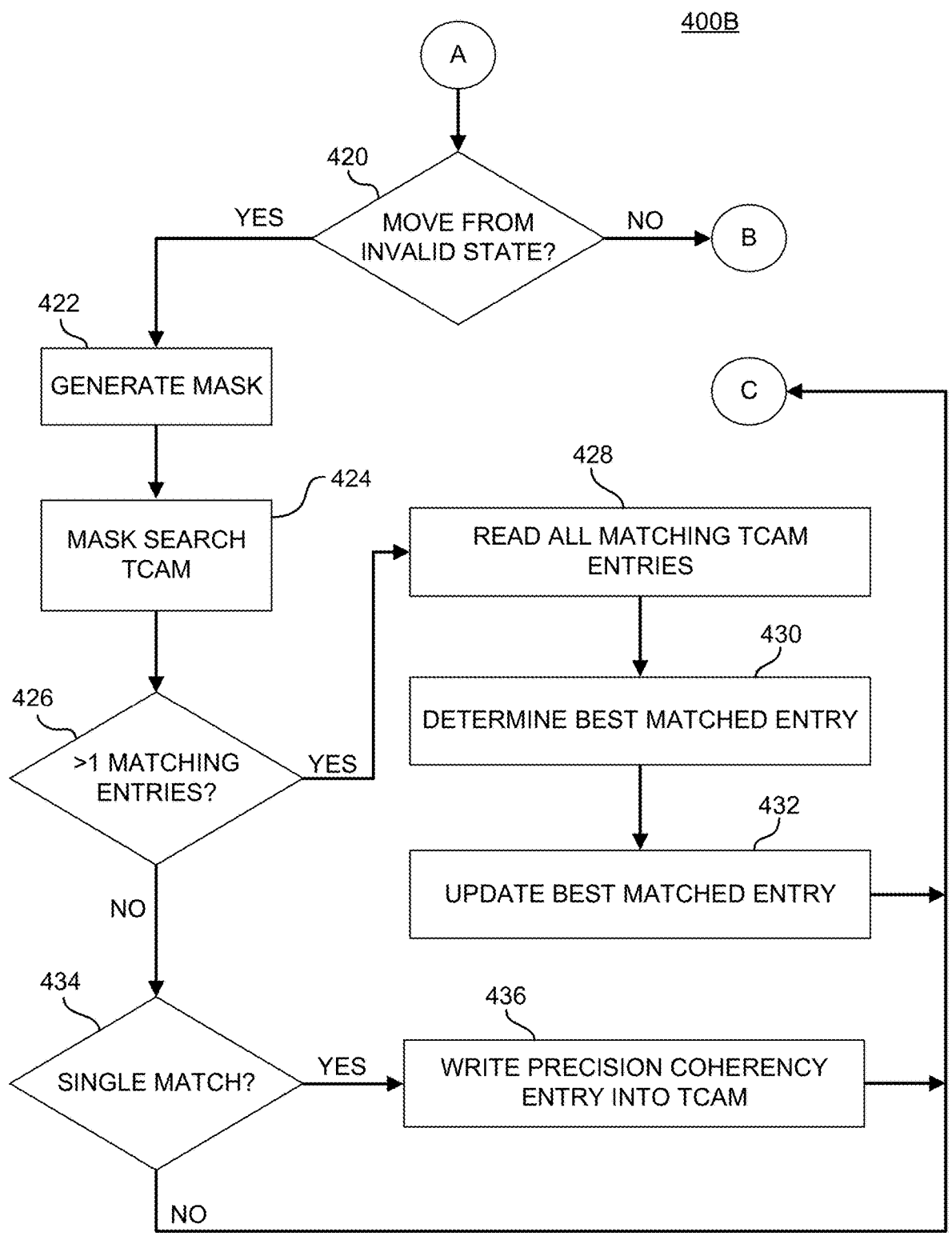
FIG. 4B shows a first part of an example TCAM update process in accordance with embodiments of the technology disclosed herein.

As discussed above, embodiments of the present disclosure enable a faster response to cache coherency protocol requests from a local processor socket. FIGS. 4A-4B illustrate various parts of a cache coherency method in accordance with embodiments of the present disclosure. The cache coherency method shown in FIGS. 4A-4B may be implemented by node controller of a node, such as node controllers 1 and 2 discussed above with respect to FIG. 2.

FIG. 4A illustrates an example snoop request process 400A in accordance with embodiments of the present disclosure. Snoop request process 400A starts with receiving by a TCAM accelerator of a node controller a cache coherency protocol request from a local processor socket at operation 402. In various embodiments, a cache coherency protocol request may include, but is not limited to, a snoop request, an update to change the coherency protocol state of a data block (cache line) to invalid, or an update to change the coherency protocol state of a data block (cache line) from invalid to some other state (e.g., M, E, S). In various embodiments, the TCAM accelerator of the node controller may be similar to TCAM accelerator 300 discussed above with respect to FIG. 300. In various embodiments, if the TCAM accelerator determines the cache coherency protocol request is not a snoop request (operation 404), the process determines if the cache coherency protocol request is to make a state transition to/from the Invalid state (operation 418). If not, the process may return to operation 402 and wait for another request. If the request is an update to the invalid state or an update from the invalid state, the process may go to another process (as indicated by reference A). In various embodiments, the nature of the cache coherency protocol request may be determined by a state machine of the TCAM accelerator based on the input line(s) over which the request is received, similar to the situation discussed above with respect to FIG. 300.

If node controller logic or the node controller TCAM accelerator determines the received cache coherency protocol request is a snoop request, the TCAM may be searched at operation 406. In various embodiments, operation 406 may include sending the address received in the snoop request to the TCAM by a state machine, similar to the discussion with respect to FIG. 3 above. Operation 406 may also include the operation of TCAM 301 and match logic 303 discussed with respect to FIG. 3 above. As discussed above, the technology disclosed herein takes advantage of the properties of a TCAM to accelerate responses to cache coherency protocol requests. Specifically, the "don't care" bit of a TCAM entry reduces the need for an exact match as with more binary approaches (e.g., a CAM), which would require a specific entry (of a fixed size) for each potential address in order to determine ownership without the need to access the coherency directory. Rather, TCAM entries may vary in size, enabling the creation of two or more entries which would be hit as a match if a search is conducted. In various embodiments, base entries and precision entries may be present within the TCAM. A base entry may be an entry which, using the wildcard bit, can track data blocks of variable size, but covering a range of data addresses. As a non-limiting example, base entries may be expressed as:

| Location (Hex) | Match to Value (Binary) |
| --- | --- |
| 0000 | 0000_0000_0000_0000_xxxx_xxxx_xxxx_xxxx |
| 0001 | 0000_0000_0000_0001_xxxx_xxxx_xxxx_xxxx | where the location is the TCAM entry indictor, and the match to value represents the value to be matched. The wildcard ("x") allows each entry to track a range of cache lines. As shown, TCAM entry 0000 is set to track addresses from 0000_0000_0000_0000_0000_0000_0000_0000 to 0000_0000_0000_0000_1111_1111_1111_1111. The addresses are shown as 32-bit binary values for illustrative purposes. If an exact match was required, a separate entry would be required for all of the addresses which are covered by this single TCAM entry.

Because each base entry may cover a larger number of addresses than a single, exact match entry, embodiments of the present technology may utilize precision entries to provide earlier verification that a cache line, data word, or any sized group bit(s) is owned by a processor. As a non-limiting example, precision entries may be expressed as:

| Location (Hex) | Match to Value (Binary) |
| --- | --- |
| 0002 | 0000_0000_0000_0000_0000_0000_0010_0000 |
| 0003 | 0000_0000_0000_0000_0000_0000_0010_0001 | where the location is the TCAM entry indicator or entry address, and the match to value represents the value to be matched. As shown, a precision entry may be a specific address, similar to what would be expected for an exact match system.

In various embodiments, searching the TCAM at operation 404 comprises comparing an address received within the snoop request against the entries of the TCAM. If more than one matching entry is identified (operation 408), snoop request process 400A move to operation 410 and the coherency directory is accessed. In various embodiments, more than one matching entry is identified where a base entry and a precision entry are found to match the requested address. As a non-limiting example, if the address within the snoop request is 0000_0000_0000_0000_0000_0000_0010_0001, a search of a TCAM having the four example entries above would result in two matches. Specifically, the search would identify that both the base entry 0000 and the precision entry 0003 match the address from the snoop request.

Although the precision entry matches the requested address in the example, in various embodiments the precision entry may not match exactly to the requested address. As a non-limiting example, where several precision entries containing adjacent addresses are present in the TCAM, the entries may be combined into a single precision TCAM entry in various embodiments, such as:

| Location (Hex) | Match to Value (Binary) |
| --- | --- |
| 0002 | 0000_0000_0000_0000_0000_0000_0010_000x |
| 0003 | Unused (combined with location 0002) |

As shown, a wildcard was used to replace the last bit of the match to value in entry 0002. Therefore, entry 0002 will match with either 0 . . . 0010_0000 or 0 . . . 0010_0001. Therefore, in this example a search would still result in two matches, this time entries 0000 and 0002. However, this does not verify that the processor has an ownership in the specifically requested address, as both entries cover more than a single entry, nor the particular state. Accordingly, in various embodiments, where multiple matches are detected the coherency director is accessed to determine the ownership type of the specifically requested address.

After accessing the coherency directory, a response is sent to the requesting local processor socket, based on the state of the requested memory block as reference by its address, at operation 412. Multiple matching entries indicates that the requested memory block may be active (i.e., not in an invalid state). The coherency directory may be accessed to verify the current state and ownership of the requested memory block. In various embodiments, the state of the requested memory block may be one of the states discussed above (i.e., M, E, S, I) or other common states used in cache coherency protocols. The state of each owned memory block is maintained in the coherency directory maintained by the node controller and may be stored in the local memory of a local processor, as part of the node controller or a combination of the two.

In one embodiment, if one or fewer matching entries are found at operation 408, a determination is made whether a single matching entry was found at operation 414. If no matching entries were found, the coherency directory may be accessed at operation 410 in various embodiments, similar to where multiple entries match. No matches being found indicates that the TCAM did not include any entries tracking the area of shared memory in which the address is located. Accordingly, to verify the state and that the memory block is not active (i.e., owned) by a remote processor, a search of the coherency directory may be required. In some embodiments, no matches being found indicates that the TCAM did not include any entries tracking the area of shared memory in which the address is located and the memory block is assumed to be in the Invalid state (i.e., move to operation 416). The different actions when a no match is indicated are represented by dotted lines in FIG. 4A.

If only a single match is found at operation 414, than the node controller can send a response to the requesting node controller indicating the address is in the invalid state at operation 416. As discussed above, base entries in the TCAM may cover a wider range of addresses within the shared memory address space through the use of the wildcard bits. In various embodiments, a single match may indicate that a base entry was matched, but that no precision entry is in the TCAM for the requested memory block address. If a processor had ownership of the memory block associated with the address, a precision entry would also have been included within the TCAM. Accordingly, because only one match is detected, the node controller can determine that the memory block is in the invalid state and respond to the requesting local processor without the need to access the coherency directory. In this way, the latency in responding to snoop requests is decreased, increasing the efficiency and performance of the system.

If the cache coherency protocol request received is determined not to be a snoop request at operation 404, the process moves to operation 418 to determine if the cache coherency protocol request is a cache coherency update request. A cache coherency update request may be a cache coherency protocol request to make a state transition to the Invalid state or a cache coherency protocol request from the Invalid state. If not, the process may return to operation 402 and wait for another request. If the request is determined to be a cache coherency update request (i.e., an update to the invalid state or an update from the invalid state), the process moves (at reference A) to a TCAM update process 400B in accordance with embodiments of the present disclosure, illustrated in FIGS. 4B and 4C. A cache coherency update request may either be a request to change the state of a cache line or other data block from invalid to some other state, or to update from a non-invalid state to the invalid state. In other embodiments, other state transitions and ownership changes maybe processed. At operation 420, a determination is made whether the cache coherency update request indicates a move of state from invalid to a non-invalid state. A move to a non-invalid state (one of the valid states) indicates that the requested memory block is now active for a processor. If the determination is "YES," the process moves to operation 422, where a mask is generated. In various embodiments, the mask may be generated by a mask generator, such as mask generator 304 shown in FIG. 3. In various embodiments, the mask comprises a plurality of mask bits equal to the number of bits used within TCAM 301, serving as a search pattern to be used in conducting a global bit search of TCAM 301. As a non-limiting example, when a mask bit is enabled (e.g., is set to "1"), the mask indicates that a match is required between the corresponding bit in the address within the cache coherency update request and the TCAM entry. If the mask bit is not enabled (e.g., is set to "0") the mask indicates that the search should treat that bit as a "don't care" bit and will require between the corresponding bit in the address within the cache coherency update request and the TCAM entry.

At operation 424 a masked search is performed of the TCAM. In various embodiments, a masked search is conducted by applying the generated mask to the global bit enables associated with the search of the TCAM for the duration of the search operation, such as illustrated in FIG. 3.

If multiple matches are identified through the masked search of the TCAM at operation 426, all of the matched entries of the TCAM are read out at operation 426. In various embodiments, operation 428 may include matching logic (e.g., match logic 303 of FIG. 3) sending an indication that multiple matches were found, and the TCAM entry indicators of those matching entries, to a state machine (e.g., state machine 302 of FIG. 3). In various embodiments, operation 428 may further include the state machine requesting the TCAM entries associated with the multiple matching TCAM entry indicators received from the match logic. Referring to FIG. 3, in response to receiving multiple TCAM entry indicators, state machine 302 may send a read signal on the Read line to TCAM 301, requesting the values in the identified matched TCAM entries, which may be read out to state machine 302 over the Read Data lines. The TCAM entries to be read are provided to TCAM 301 by state machine 302 over the Read Data line(s).

Referring back to FIG. 4B, at operation 430, the best matched entry is determined from all of the matched entries. The determination of the best matched entry is conducted based on the entry values read from the TCAM. In various embodiments, the best matched entry may be the TCAM entry spanning the smallest range of addresses. In some embodiments, the best matched entry may be a precision entry for a specific address, a precision entry tracking more than one specific address, or in other embodiments a base entry tracking a wide range of addresses in shared memory.

Once the best matched entry is determined, the best matched entry is updated at operation 432. In some embodiments, updating the best matched entry may include combining one or more TCAM entries into a single entry. As a non-limiting example, where the relevant addresses are adjacent to each other, a single TCAM entry may be created using wildcards (i.e., "don't care" bits) to cover all the adjacent addresses, similar to the combination of entries 0002 and 0003 discussed in the non-limiting example above.

In some embodiments, updating the best matched entry may include generating a new precision entry when the current precision entries values in the TCAM are not close enough to the requesting address of the memory block undergoing the cache coherency protocol state transition. The determination of the best entry may consider the number of TCAM entries available for use.

After updating the best matched entry, process 400B returns to see whether a new cache coherency protocol request has been received, as shown by common reference C shown in FIGS. 4A and 4B.

If one or fewer matches are identified at operations 426, TCAM update process 400B moves to operation 434 to determine if a single match is identified. If a single match is identified, at operation 436 a new precision entry is written into the TCAM. A single match indicates that a base entry matches the address at issue. Because the cache coherency update request indicates that an address is being activated, a precision entry for that address may be entered into the TCAM, to enable the TCAM accelerator to track the now-active address. In this way, upon a subsequent snoop request for that address would result in a double match. Without including the precision entry, the TCAM accelerator may incorrectly identify the address as being invalid due to only a single match (i.e., the base entry) being detected.

If no match is detected at operation 434, TCAM update process 400B returns to see whether a new cache coherency protocol request has been received, as shown by common reference C shown in FIGS. 4A and 4B. In other embodiments, a base entry may be written to the TCAM if no match is detected at operation 434.

Figure 4C:
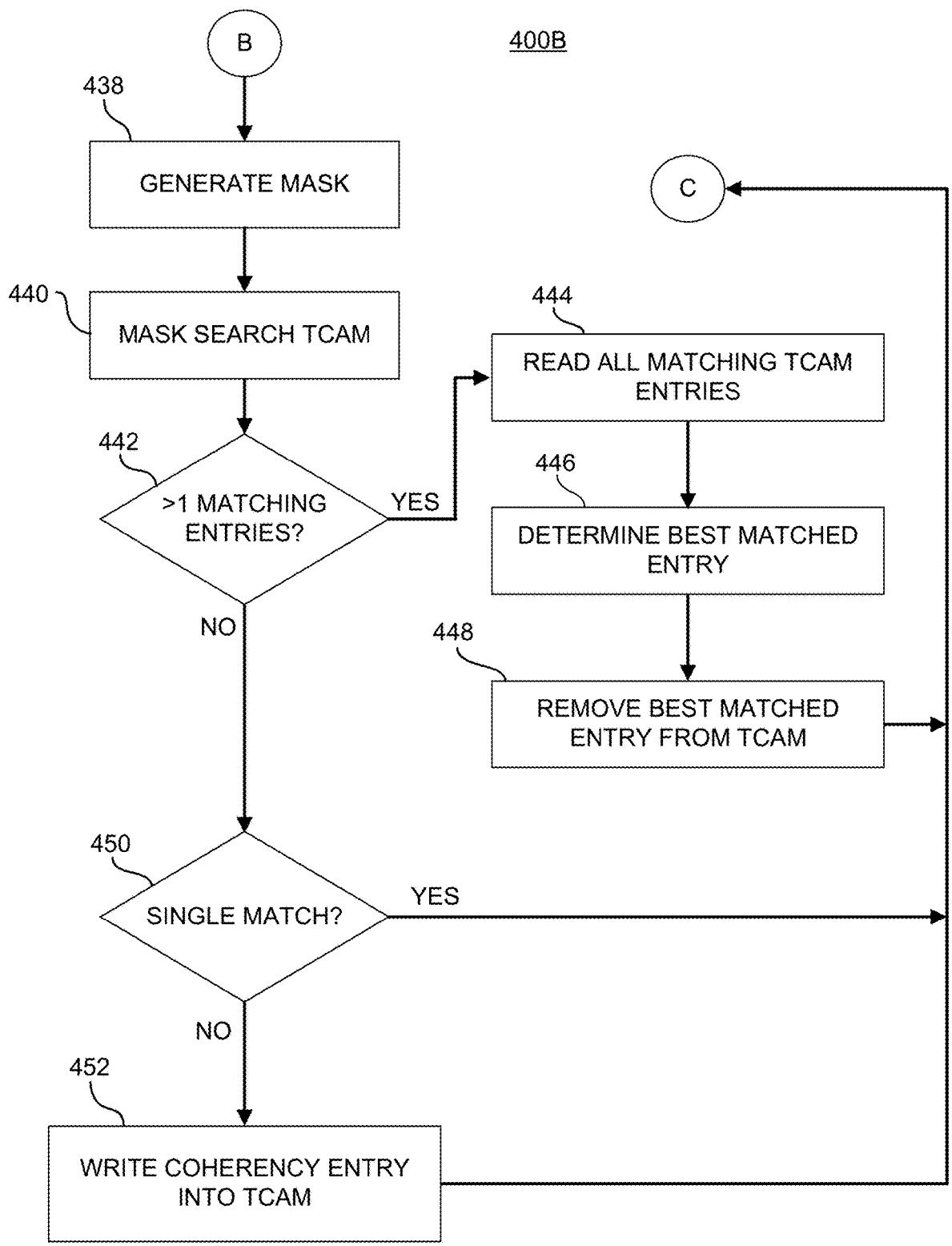
FIG. 4C shows a second part of an example TCAM update process in accordance with embodiments of the technology disclosed herein.

If the cache coherency update request does not indicate a move from the invalid state at operation 420, TCAM update process 400B moves to operation 438 shown in FIG. 4C (as indicated by common reference B in FIGS. 4B and 4C). A cache coherency update request, as far as the TCAM accelerator is concerned, is either an update from an invalid state, or an update to an invalid state. Other types of cache coherency updates not used by the TCAM accelerator may be filter out by other parts of the node controller. Therefore, if the cache coherency update request is determined not to be a move from the invalid state, it is a request to move to the invalid state (i.e., become unused). At operation 438, a mask is generated. In various embodiments, operation 438 may be performed in a similar manner as operation 422 discussed with respect to FIG. 4B. In various embodiments, the mask generated may be the same as the mask generated at operation 422, while in other embodiments the mask may be different. After the mask is generated, a masked search of the TCAM occurs at operation 440. The masked search at operation 440 may be performed in a manner similar to that discussed with respect to operation 424 of FIG. 4B. In some embodiments, the generated mask may have no effect on the TCAM search.

At operation 442, it is determined if more than one TCAM entry matches. If multiple matches are detected, TCAM update process 400B moves to operation 444 and reads all the matching TCAM entries and, at operation 446, determines the best matched entry. Operations 444, 446 may be performed in a manner similar to operations 428, 430 discussed with respect to FIG. 4B. At operation 446, the best matched entry may be a precision entry associated with the address within the cache coherency protocol request. An entry may constitute the "best matched" where the range of data blocks tracked by the specific entry is closest to the address within the cache coherency protocol request in some embodiments. In various embodiments, the "best matched"

entry may track an address adjacent to the address within the cache coherency protocol request (e.g., locations hex 0002 and 0003 discussed above).

After the best matched entry is determined, it is removed from the TCAM at operation 448 and/or another entry is modified or a new entry is written. As discussed above, a cache update to the invalid state is an indication that the memory data block associated with the address is to be unused and therefore available for use at a later time. Accordingly, to ensure that the address is correctly identified as invalid going forward, the TCAM needs to be configured such that only a single match is detected upon a subsequent snoop request. In various embodiments, the best matched entry may be a precision entry for a specific address, whereas in other embodiments the best matched entry may be a precision entry for more than one specific address. In some embodiments, this operation may require that one or more new precision entries be written to the TCAM. After removing the best matched entry at operation 448, TCAM update process 400B returns to check for a subsequent cache coherency protocol request (indicated by common reference C in FIGS. 4A and 4B).

If one or fewer matches are identified at operations 442, TCAM update process 400B determines whether a single match is detected at operation 450. If a single match is identified ("YES"), process 400B returns to operation 402 of process 400A (through common reference C). If no match is detected at operation 450, however, a coherency entry is written into the TCAM at operation 452. A lack of any matching entry indicates that the TCAM is not currently tracking any data block range encompassing the address within the cache coherency protocol request. Adding a coherency entry into the TCAM enables the TCAM to track the address in the future, such that upon a subsequent cache coherency protocol request (snoop or update) at least one matching entry will be detected. This increases the overall efficiency of the TCAM accelerator, increasing the scope of tracked data blocks and further reducing the potential need to access the coherency directory. In some embodiments, operation 452 may comprise writing a new base entry covering a range including the address within the cache coherency protocol request. In other embodiments, operation 452 may comprise modifying a current TCAM entry to cover the address within the cache coherency protocol request.

Figure 5:
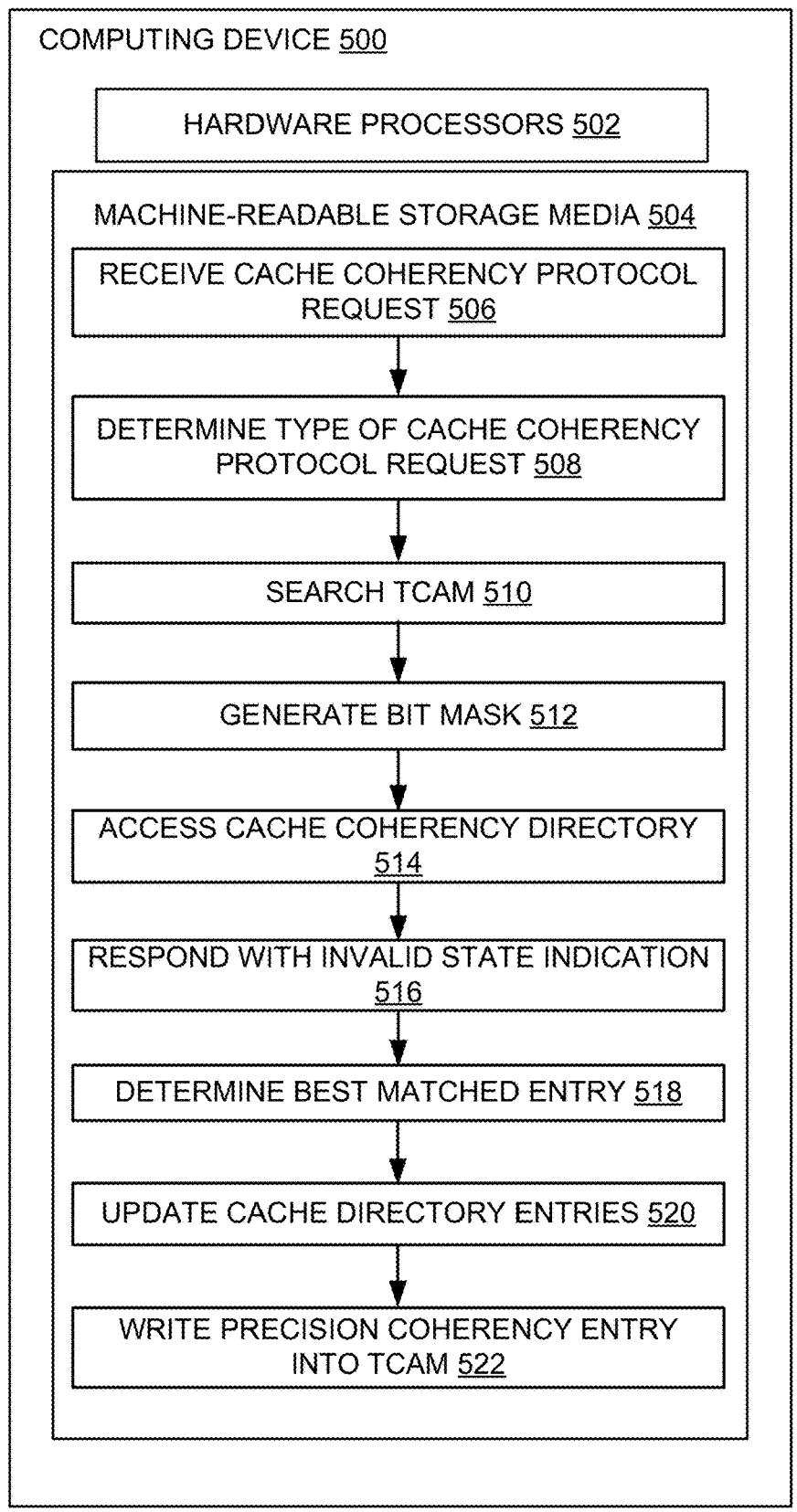
FIG. 5 is an example computing device in accordance with embodiments of the technology disclosed herein.

FIG. 5 is an example computing device 500 in accordance with embodiments of the present disclosure. Where operations and functionality of computing device 500 are similar to those discussed with respect to FIGS. 1-3 and 4A-4C, the description should be interpreted to apply. Computing device 500 includes hardware processors 502. In various embodiments, hardware processors 502 may include one or more processors.

Hardware processors 502 are configured to execute instructions stored on a machine-readable medium 504. Machine readable medium 504 may be one or more types of non-transitory computer storage mediums. Non-limiting examples include: flash memory, solid state storage devices (SSDs); a storage area network (SAN); removable memory (e.g., memory stick, CD, SD cards, etc.); or internal computer RAM or ROM; among other types of computer storage mediums. The instructions stored on the machine-readable medium 506 may include various sub-instructions for performing the function embodied by the identified functions. For example, the instruction "receive cache coherency protocol request" may include various sub-instructions for receiving, by a node controller, one or more cache coherency protocol requests from a plurality of local processors and node controllers from other nodes within a multiprocessor system in a manner discussed with respect to FIGS. 1-3 and 4A-4C above.

The instruction "determine type of cache coherency protocol request" 508 may include sub-instructions for determining whether the cache coherency protocol request comprises a snoop request or a cache coherency update request, in a manner similar to that discussed with respect to FIGS. 1-3 and 4A-4C. In various embodiments, instruction 508 may include sub-instructions for determining whether a cache coherency protocol update request is a request to change from an invalid state or to an invalid state in a manner similar to those discussed with respect to FIGS. 1-3 and 4A-4C.

The instruction "search TCAM" 510 may include sub-instructions for initiating and conducting a search of a TCAM similar to the manner discussed with respect to FIGS. 1-3 and 4A-4C. The instruction "generate bit mask" 512 may include sub-instructions for generating a bit mask associated with a cache coherency protocol update request to an invalid state or with a cache coherency protocol update request from an invalid state in a manner similar to that discussed with respect to FIGS. 1-3 and 4A-4C.

The instruction "access coherency directory" 514 may include sub-instructions for accessing a coherency directory in a manner similar to FIGS. 1-3 and 4A-4C. In various embodiments, operation 514 may include instructions for sending messages to a processor associated with the local memory to access the coherency directory.

The instruction "respond with state indication" 516 may include sub-instructions for communicating an indication of an invalid state to another node controller in response to a snoop request, as discussed with respect to FIGS. 1-3 and 4A-4C. The instruction "determine best matched entry" 518 may include sub-instructions for evaluating multiple matched entries in a manner similar to that discussed with respect to FIGS. 1-3 and 4A-4C. The instruction "update cache directory entries" 520 comprises instructions for updating TCAM entries in a manner similar to that discussed with respect to FIGS. 1-3 and 4A-4C. The instruction "write precision coherency entry into TCAM" 522 may include sub-instructions for writing a precision entry into the TCAM in a manner similar to that discussed with respect to FIGS. 1-3 and 4A-4C.

Figure 6:
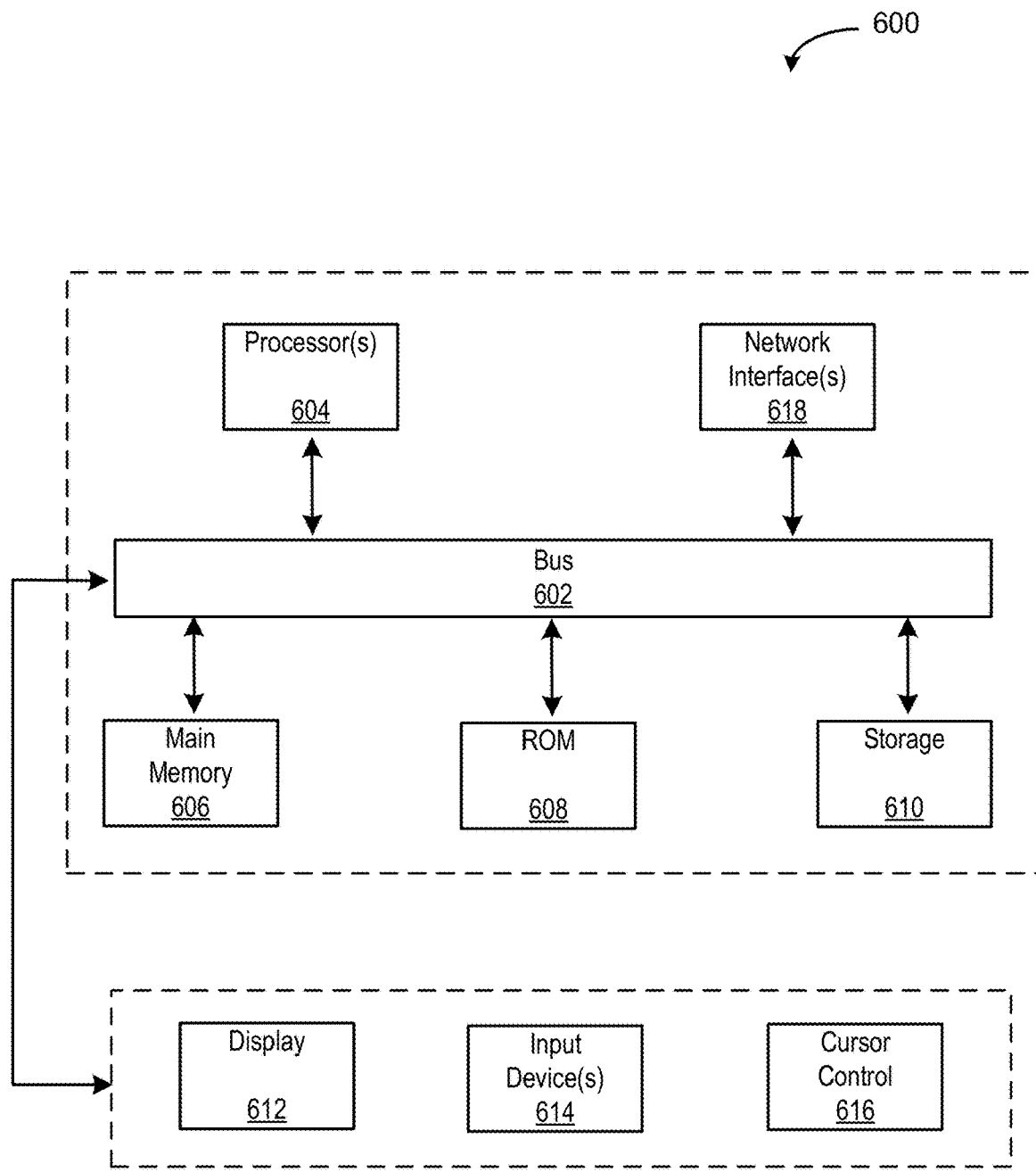
FIG. 6 is an example computing system in which embodiments described in the present disclosure may be implemented.

FIG. 6 depicts a block diagram of an example computer system 600 in which various of the embodiments described herein may be implemented. The computer system 600 includes a bus 602, network, crossbar or other communication interconnect mechanism for communicating information, one or more hardware processors 604 coupled with bus 602 for processing information. Hardware processor(s) 604 may be, for example, one or more general purpose microprocessors. In various embodiments, the one or more hardware processors 604 may execute non-transitory machine-readable instructions to perform the various functions of the embodiments discussed with respect to FIGS. 1-3 and 4A-4C.

The computer system 600 also includes a main memory 606, such as a random access memory (RAM), cache and/or other dynamic storage devices, coupled to bus 602 or other communication interconnect mechanism for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 or other communication interconnect mechanism for storing static information and instructions for processor 604. A storage device 610, such as a magnetic disk, optical disk, or USB thumb drive (Flash drive), etc., is provided and coupled to bus 602 for storing information and instructions.

The computer system 600 may further include a display 612, input device 614, and/or a cursor control 616 coupled to bus 602 or other communication interconnect mechanism for displaying, communicating, and entering information and/or commands. In some embodiments, the same direction information and command selections as cursor control may be implemented via receiving touches on a touch screen without a cursor. The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. In various embodiments, such instructions may be similar to those discussed with respect to FIG. 5. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infrared data communications.

The computer system 600 also includes a communication interface 618 coupled to bus 602 or other communication interconnect mechanism for enabling two way communication with one or more networks over one or more network links. For example, communication interface 618 may be an integrated services digital network (ISDN) card, cable modem, satellite modem, a modem to provide a data communication connection to a corresponding type of telephone line, a local area network (LAN), a wide area network, or one or more types of wireless communication links.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the figures accompanying this disclosure and described in the preceding sections are provided for illustrative purposes only, and should not be interpreted as limiting the scope of the present disclosure. The scope of this disclosure is governed by the claims attached hereto and similar embodiments as would be within the ordinary skill of the art, using the same or equivalent elements. The omission of common components, circuits, devices, machines, or other elements which are known in the art to be present in apparatuses and devices in accordance with the present disclosure does not constitute such components falling outside the scope of this disclosure. A person of ordinary skill in the art knows how such common components are utilized and can understand the subject matter without specific recitation of these common components.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, circuitry might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

In common usage, the term "or" should always be construed in the inclusive sense unless the exclusive sense is specifically indicated or logically necessary. The exclusive sense of "or" is specifically indicated when, for example, the term "or" is paired with the term "either," as in "either A or B." As another example, the exclusive sense may also be specifically indicated by appending "exclusive" or "but not both" after the list of items, as in "A or B, exclusively" and "A and B, but not both." Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
   receiving, by a node controller, a cache coherency protocol request;
   determining, by the node controller, that the cache coherency protocol request comprises a snoop request;
   searching, by the node controller, a ternary content addressable memory (TCAM) based on an address within the cache coherency protocol request, wherein the search of the TCAM comprises:
      comparing the address within the cache coherency protocol request to a plurality of entries of the TCAM, wherein the plurality of entries comprise at least a base entry and a precision entry,
      when the address matches both the base entry and the precision entry, accessing a coherency directory to determine an ownership type of the address and a corresponding state, and
      when the address matches the base entry and not the precision entry, determining that a memory data block defined by the address is in an invalid state;
   sending, by the node controller, a response to the cache coherency protocol request comprising the corresponding state or the invalid state.

2. The method of claim 1, further comprising:
   searching, by the node controller, the coherency directory for an entry associated with the address within the cache coherency protocol request, wherein the
   response including a reference to the memory data block defined by the address.

3. The method of claim 1, further comprising:
   receiving a cache coherency update request including a second address; and
   determining, by the node controller, if the coherency directory update indicates a move from the invalid state to another state for a second memory data block defined by the second address within.

4. The method of claim 3, further comprising, in response to determining the coherency directory update indicates the move from the invalid state:
   setting, by the node controller, a mask comprising a search pattern based on the second address;
   performing, by the node controller, a masked search of the TCAM using the mask; and
   in response to determining only one match between entries of the TCAM and the second address based on the mask, write, by the node controller, a single cache coherency entry in the TCAM to indicate a new state for the memory data block defined by the second address other than the invalid state.

5. The method of claim 4, further comprising, in response to detecting more than one match between the second address within the cache coherency protocol request and entries of the TCAM:
   reading, by the node controller, all matching entries of the TCAM;
   identifying, by the node controller, a best matched entry; and
   updating, by the node controller, the best matched entry to indicate a new state for the second memory data block defined by the second address other than the invalid state.

6. The method of claim 5, wherein identifying the best matched entry comprises identifying a TCAM entry configured to track a third address adjacent to the second address.

7. The method of claim 3, further comprising, in response to determining the cache coherency update request indicates the move to the invalid state for the second memory data block defined by the second address:
  setting, by the node controller, a mask comprising a search pattern based on the second address;
  performing, by the node controller, a masked search of the TCAM using the mask; and
  in response to determining no match between entries of the TCAM and the second address based on the mask, writing, by the node controller, a new TCAM entry into the TCAM associated with the second address.

8. The method of claim 7, wherein writing the new TCAM entry comprises updating a current TCAM entry to cover the second address.

9. The method of claim 7, further comprising, in response to determining more than one match between the second address and entries of the TCAM:
  reading, by the node controller, all matching entries of the TCAM;
  identifying, by the node controller, a best matched entry; and
  removing, by the node controller, the best match entry.

10. The method of claim 1, wherein the address within the cache coherency protocol request comprises a wildcard bit.

11. The method of claim 1, wherein the search of the TCAM further comprises:
  when the address matches no entries of the TCAM, determining that the memory data block defined by the address is in the invalid state.

12. A non-transitory machine-readable storage medium storing instructions thereon that when executed cause a controller processor to:
  receive a cache coherency protocol request;
  determine that the cache coherency protocol request comprises a snoop request;
  search a ternary content addressable memory (TCAM) based on an address within the cache coherency protocol request, wherein the search of the TCAM comprises:
    comparing the address within the cache coherency protocol request to a plurality of entries of the TCAM, wherein the plurality of entries comprise at least a base entry and a precision entry;
    when the address matches both the base entry and the precision entry, accessing a coherency directory to determine an ownership type of the address and a corresponding state; and
    when the address matches the base entry and not the precision entry, determining that a memory data block defined by the address is in an invalid state; and
  send a response to the cache coherency protocol request comprising the corresponding state or the an invalid state.

13. The non-transitory machine-readable storage medium of claim 12, comprising instructions that when executed by the controller processor cause the controller processor further to
  search the coherency directory for an entry associated with the address within the cache coherency protocol request; and
  in response to detecting a match between an entry of the coherency directory and the address within the cache coherency protocol request, wherein the response including a reference to the memory data block defined by the address.

14. The non-transitory machine-readable storage medium of claim 12, comprising instructions that when executed by the controller processor cause the controller processor further to:
  receive a cache coherency update request including a second address; and
  determine if the coherency directory update indicates a move from the invalid state to another state for a second memory data block defined by the second address.

15. The non-transitory machine-readable storage medium of claim 14, comprising instruction that when executed by the controller processor cause the controller processor further to, in response to determining the cache coherency update request indicates the move from the invalid state:
  set a mask comprising a search pattern based on the second address;
  perform a masked search of the TCAM using the mask; and
  in response to determining only one match between entries of the TCAM and the second address based on the mask, write a single cache coherency entry in the TCAM to indicate a new state for the memory data block defined by the second address other than the invalid state.

16. The non-transitory machine-readable storage medium of claim 15, comprising instructions that when executed by the controller processor cause the controller processor further to, in response to detecting more than one match between the address within the cache coherency protocol request and entries of the TCAM:
  read all matching entries of the TCAM;
  identify a best match entry; and
  update the best matched entry to indicate the new state for the second memory data block defined by the second address other than the invalid state.

17. The non-transitory machine-readable storage medium of claim 14, comprising instructions that when executed by the controller processor cause the controller processor further to, in response to determining the cache coherency update request indicates the move to the invalid state:
  set a mask comprising a search pattern based on the second address;
  perform a masked search of the TCAM using the mask; and
  in response to determining no match between entries of the TCAM and the received cache coherency update request based on the mask, writing a new TCAM entry into the TCAM associated with the second address, the new TCAM entry indicating a state other than the invalid state.

18. The non-transitory machine-readable claim of 17, wherein writing the new TCAM entry comprises updating a current TCAM entry to cover the second address.

19. A system, comprising:
  a plurality of nodes, each node comprising:
    a plurality of processors, each processor having a set of local memory components and a set of cache memory components;
    one or more node controllers, each node controller communicatively coupled to a subset of the plurality of processors; and
    each node controller comprising a ternary content addressable memory (TCAM) accelerator associated to a subset of the plurality of processors of the respective node controller, the TCAM accelerator comprising a TCAM having a plurality of base entries and a plurality of precision entries, wherein a search of the TCAM comprises:
  comparing an address within a cache coherency protocol request to the plurality of base entries and the plurality of precision entries,
  when the address matches both a base entry from the plurality of base entries and a precision entry from the plurality of precision entries, accessing a coherency directory to determine an ownership type of the address and a corresponding state, and
  when the address matches the base entry and not the precision entry, determining that a memory data block defined by the address is in an invalid state; and
wherein each of the plurality of nodes is communicatively coupled to each of the other nodes in the plurality of nodes and each node shares a common operating system.

* * * * *